(12) United States Patent
Alequin et al.

(10) Patent No.: US 11,485,265 B2
(45) Date of Patent: Nov. 1, 2022

(54) SYSTEM AND METHOD FOR PROVIDING MASSAGING WITHIN A VEHICLE

(71) Applicant: Honda Motor Co., Ltd., Tokyo (JP)

(72) Inventors: Joseph Anthony Alequin, Los Angeles, CA (US); Rebecca Lee Lyss, St. Louis, MO (US)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 16/916,090

(22) Filed: Jun. 29, 2020

(65) Prior Publication Data

US 2020/0331375 A1 Oct. 22, 2020

Related U.S. Application Data

(62) Division of application No. 15/939,761, filed on Mar. 29, 2018, now Pat. No. 10,836,292.

(51) Int. Cl.
*B60N 2/90* (2018.01)
*B60N 2/00* (2006.01)
*A61H 1/00* (2006.01)

(52) U.S. Cl.
CPC .......... *B60N 2/976* (2018.02); *A61H 1/001* (2013.01); *B60N 2/002* (2013.01);
(Continued)

(58) Field of Classification Search
CPC ........ B60N 2/976; B60N 2/002; A61H 1/001; A61H 2201/0149; A61H 2201/5012;
(Continued)

(56) References Cited

U.S. PATENT DOCUMENTS 8,467,324 B2 6/2013 Yousefi et al.
8,616,654 B2 12/2013 Zenk et al.
(Continued)

FOREIGN PATENT DOCUMENTS

DE 4116836 11/1992
DE 102009058492 A1 * 6/2011 ............. B60N 2/002

OTHER PUBLICATIONS

Notice of Allowance of U.S. Appl. No. 15/939,761 dated Jul. 16, 2020, 9 pages.

*Primary Examiner* — Peter D Nolan
*Assistant Examiner* — Demetra R Smith-Stewart
(74) *Attorney, Agent, or Firm* — Rankin, Hill & Clark LLP (57) ABSTRACT

A system and method for providing massaging within a vehicle that include receiving vehicle dynamic data associated with a real-time dynamic performance of the vehicle as the vehicle is being driven for a predetermined period of time. The system and method also include determining at least one strenuous driving activity associated with a driver of the vehicle based on at least one driving maneuver. The system and method additionally include analyzing positional parameters and movement parameters that are associated with at least one area of a body of the driver that is utilized to conduct the at least one driving maneuver for the predetermined period of time. The system and method further include controlling at least one massaging element disposed within the seat of the vehicle to provide massaging to the at least one area of the body of the driver.

20 Claims, 5 Drawing Sheets

(52) U.S. Cl.
CPC ........... *A61H 2201/0149* (2013.01); *A61H 2201/5012* (2013.01); *A61H 2201/5043* (2013.01); *A61H 2201/5064* (2013.01); *A61H 2203/0431* (2013.01); *A61H 2230/605* (2013.01); *A61H 2230/625* (2013.01)

(58) Field of Classification Search
CPC .... A61H 2201/5043; A61H 2201/5064; A61H 2203/0431; A61H 2230/605; A61H 2230/625
See application file for complete search history.

(56) References Cited

U.S. PATENT DOCUMENTS

| | | |
|---|---|---|
| 8,870,813 B2 | 10/2014 | Ferren et al. |
| 9,504,416 B2 | 11/2016 | Young et al. |
| 9,579,998 B2 | 2/2017 | Hall et al. |
| 2011/0277616 A1 | 11/2011 | Park |
| 2012/0086249 A1* | 4/2012 | Hotary ............... B60N 2/20 297/284.3 |
| 2013/0038102 A1 | 2/2013 | Friderich et al. |
| 2015/0165269 A1 | 6/2015 | Herrala et al. |
| 2015/0313475 A1 | 11/2015 | Benson et al. |
| 2016/0354027 A1 | 12/2016 | Benson et al. |
| 2018/0134195 A1 | 5/2018 | Ketels et al. |
| 2018/0170231 A1 | 6/2018 | Song |
| 2019/0031061 A1* | 1/2019 | Reith ............... B60N 2/5635 |

* cited by examiner

SYSTEM AND METHOD FOR PROVIDING MASSAGING WITHIN A VEHICLE

CROSS-REFERENCE TO RELATED APPLICATION

This application is a divisional of U.S. application Ser. No. 15/939,761 filed Mar. 29, 2018, which is expressly incorporated herein by reference.

BACKGROUND

Currently vehicles may be equipped with massaging seats that may be configured to generally massage backs of drivers as they drive the vehicles. Such seats may generally provide massaging that is accomplished by vibration that is directed to one or more portions of the driver's seat. However, a key limitation to the massaging seats are that they only provide vibration to one or more areas of the backs of the drivers. Consequently, the massaging seats may not provide specific and customized relief that may alleviate tension associated with one or more areas of each driver's body as they drive the vehicles.

BRIEF DESCRIPTION

According to one aspect, a computer-implemented method for providing massaging within a vehicle that includes receiving vehicle dynamic data associated with a real-time dynamic performance of the vehicle as the vehicle is being driven for a predetermined period of time. The computer-implemented method also includes determining at least one strenuous driving activity associated with a driver of the vehicle based on at least one driving maneuver that is associated with the real-time driving performance of the vehicle. The computer-implemented method additionally includes analyzing positional parameters and movement parameters that are associated with at least one area of a body of the driver that is utilized to conduct the at least one driving maneuver for the predetermined period of time. The computer-implemented method further includes controlling at least one massaging element disposed within the seat of the vehicle to provide massaging to the at least one area of the body of the driver.

According to another aspect, a system for providing massaging within a vehicle that includes a memory storing instructions when executed by a processor that cause the processor to receive vehicle dynamic data associated with a real-time dynamic performance of the vehicle as the vehicle is being driven for a predetermined period of time. The instructions also cause the processor to determine at least one strenuous driving activity associated with a driver of the vehicle based on at least one driving maneuver that is associated with the real-time driving performance of the vehicle. The instructions also cause the processor to analyze positional parameters and movement parameters that are associated with at least one area of a body of the driver that is utilized to conduct the at least one driving maneuver for the predetermined period of time. The instructions further control at least one massaging element disposed within the seat of the vehicle to provide massaging to the at least one area of the body of the driver.

According to still another aspect, non-transitory computer readable storage medium storing instructions that when executed by a computer, which includes a processor perform a method that includes receiving vehicle dynamic data associated with a real-time dynamic performance of the vehicle as the vehicle is being driven for a predetermined period of time. The method also includes determining at least one strenuous driving activity associated with a driver of the vehicle based on at least one driving maneuver that is associated with the real-time driving performance of the vehicle. The method additionally includes analyzing positional parameters and movement parameters that are associated with at least one area of a body of the driver that is utilized to conduct the at least one driving maneuver for the predetermined period of time. The method further includes controlling at least one massaging element disposed within the seat of the vehicle to provide massaging to the at least one area of the body of the driver.

DETAILED DESCRIPTION

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
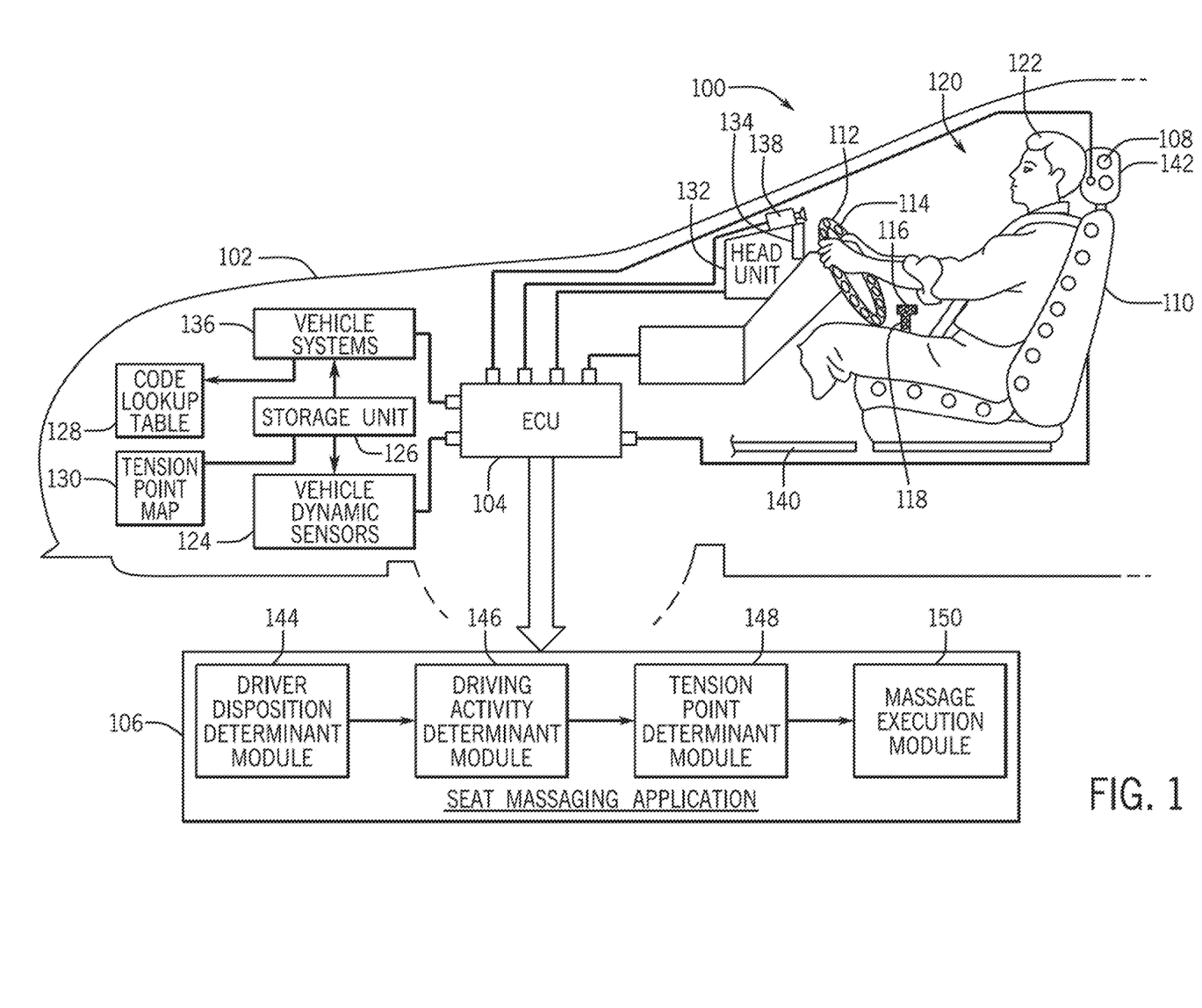
FIG. 1 is a schematic view of an operating environment for providing massaging within a vehicle according to an exemplary embodiment

Referring now to the drawings, wherein the showings are for purposes of illustrating one or more exemplary embodiments and not for purposes of limiting the same, FIG. 1 is a schematic view of an operating environment for providing massaging within a vehicle 102 according to an exemplary embodiment. The components of the environment 100, as well as the components of other systems, hardware architectures, and software architectures discussed herein, may be combined, omitted, or organized into different architectures for various embodiments.

Generally, the vehicle 102 includes an electronic control unit (ECU) 104 that executes or accesses a seat massaging execution application 106 (seat massaging application). For purposes of simplicity, this disclosure describes the application 106 as being utilized with respect to provide massaging of the driver 122 of the vehicle 102 that is seated within a driver's seat (seat) 110. However, it is to be appreciated that application 106 may be utilized with respect to a non-driving passenger of the vehicle 102 that may be seated in a front non-driving passenger seat or rear passenger seats (not shown) of the vehicle 102. Additionally, it is appreciated that the application 106 may be utilized to provide massaging at one or more additional areas of the vehicle 102 (e.g., at an arm rest of a door of the vehicle 102).

In an exemplary embodiment, the seat massaging application 106 may communicate with seat sensors 108 that are disposed within the seat 110, steering wheel sensors 112 that disposed within a steering wheel 114 of the vehicle 102, gear shift sensors 116 that are disposed within a gear shifter 118 of the vehicle 102, and/or one or more cameras 138 that are disposed within an interior cabin (cabin) 120 of the vehicle 102. As discussed below, the sensors 108, 112, 116 and/or the camera(s) 138 may provide one or more signals that may include driver disposition data that is associated with the driver 122 of the vehicle 102 seated within the seat 110.

The driver disposition data may indicate the positions of one or more areas (e.g., body parts) of the driver's body seated within the seat 110 (e.g., positions of the driver's back, the driver's arms, the driver's head, etc.) sensed/captured during a predetermined period of time (e.g., 30 minutes). The driver disposition data may additionally include movements of one or more areas of the driver's body (e.g., movements of the driver's arms, the driver's head, the driver's neck, etc.) sensed/captured during the predetermined period of time. The seat massaging application 106 may additionally communicate with a plurality of vehicle dynamic sensors 124 that may provide vehicle dynamic data associated the vehicle 102 that is sensed during the predetermined period of time.

As discussed below, the seat massaging application 106 may utilize the data associated with the positions of one or more areas of the driver's body, the movements of one or more areas of the driver's body, and the vehicle dynamic data to determine one or more strenuous driving activities that are associated with the driver 122. In one or more embodiments, the seat massaging application 106 may additionally evaluate the positions and durations of the positions of one or more areas of the driver's body, the movements and durations of the movements of one or more areas of the driver's body, and the one or more strenuous driving activities and related durations to determine one or more tension points.

The one or more tension points may be determined as specific areas of the driver's body that may be substantially utilized (e.g., tense, tired) as the driver 122 is seated within the seat 110 based on the driver's prolonged seating positions, movements, and driving maneuvers associated to one or more strenuous driving activities. The seat massaging application 106 may process and execute a massaging plan (e.g., executable data file) to massage the driver 122 seated within the seat 110. In particular, the massaging plan may include instructions to actuate one or more massaging elements (shown in FIG. 2) at one or more regions of the seat 110 and in one or more manners (e.g., frequencies, intensities) that may be utilized to massage one or more specific areas of the driver's body pertaining to the one or more tension points.

With reference to the components of the vehicle 102, the ECU 104 may include internal processing memory (not shown), an interface circuit (not shown), and bus lines (not shown) for transferring data, sending commands, and communicating with components of the vehicle 102 and the seat massaging application 106. The ECU 104 may also include a communications device (not shown) for sending data internally in the vehicle 102 and externally to connected devices.

The communication device included within the ECU 104 may be capable of providing wired or wireless computer communications utilizing various protocols to send/receive electronic signals internally to/from components of the vehicle 102. Additionally, the communication device of the ECU 104 may be operably connected for internal computer communication via a bus (e.g., a Controller Area Network (CAN) or a Local Interconnect Network (LIN) protocol bus) to facilitate data input and output between the ECU 104 and the components of the vehicle 102.

The ECU 104 may be operably connected to a storage unit 126 that may store one or more operating systems, applications, associated operating system data, user interfaces, and the like that are executed by the ECU 104. In an exemplary embodiment, the storage unit 126 may store data (e.g., executable data files) that are associated with the seat massaging application 106 to be executed by the ECU 104.

In one embodiment, the storage unit 126 may be utilized by the application 106 to store a code lookup table 128 that stores one or more predetermined code values that correspond to the positional parameters pertaining to positions of one or more areas of the driver's body, movement parameters pertaining to movements of one or more areas of the driver's body, and values associated with the one or more strenuous driving activities. As discussed below, the application 106 may access the code lookup table 128 to determine predetermined code values that correspond to the positions, movements, and/or strenuous driving activities associated with the driver 122 seated within the seat 110.

The storage unit 126 may also be utilized by the application 106 to store a tension point map 130 that may include data that maps the predetermined code values to one or more (pre-stored) tension points associated with the driver's body. In other words, the tension point map 130 may be utilized to determine one or more tension points associated with the driver's body based on data represented by the predetermined code values regarding substantial usage of one or more areas of the driver's body pertaining to positions, movements, and one or more strenuous driving activities as sensed/captured for the predetermined period of time.

In particular, the one or more tension points may correspond to one or more areas of the driver's body (e.g., upper neck, mid-neck, lower neck, left shoulder, right shoulder, upper-left back, upper-middle back, upper-right back, etc.) that may be determined as being substantially utilized. As discussed in more detail below, the one or more tension points may be based on the positions and the durations of the positions of one or more areas of the driver's body, the movements and the durations of the movements of one or more areas of the driver's body, and/or the strenuous driving activities and the durations of strenuous driving activities associated with one or more areas of the driver's body.

In one embodiment, the ECU 104 may be operably connected to a head unit 132 that may access the one or more applications and operating systems that are executed by the ECU 104. The head unit 132 may include a display unit 134 that may be positioned to present one or more user interfaces to the driver 122 seated within the seat 110. In some configurations, the display unit 134 may include a touch screen display (not shown) that may receive touch based user inputs from the driver 122 that may apply to the one or more user interfaces that are presented via the display unit 134.

In one or more embodiments, the display unit 134 may be utilized to present one or more user interfaces associated with the seat massaging application 106 that may allow the driver 122 to enable an automated massaging mode of the application 106. The automated massaging mode may be enabled by the driver 122 to allow the application 106 to provide automated massaging that is directed to one or more regions of the seat 110 to massage particular areas of the driver's body based on the massaging plan processed by the application 106. In some embodiments, the display unit 134 may be also utilized to present one or more user interfaces associated with the application 106 that may allow the driver 122 to enable the application 106 to provide a manual massaging mode. The manual massaging mode may be directed to one or more regions of the seat 110 to generally massage one or more areas of the driver's body based on manual inputs (e.g., manually selected massaging settings).

Figure 2:
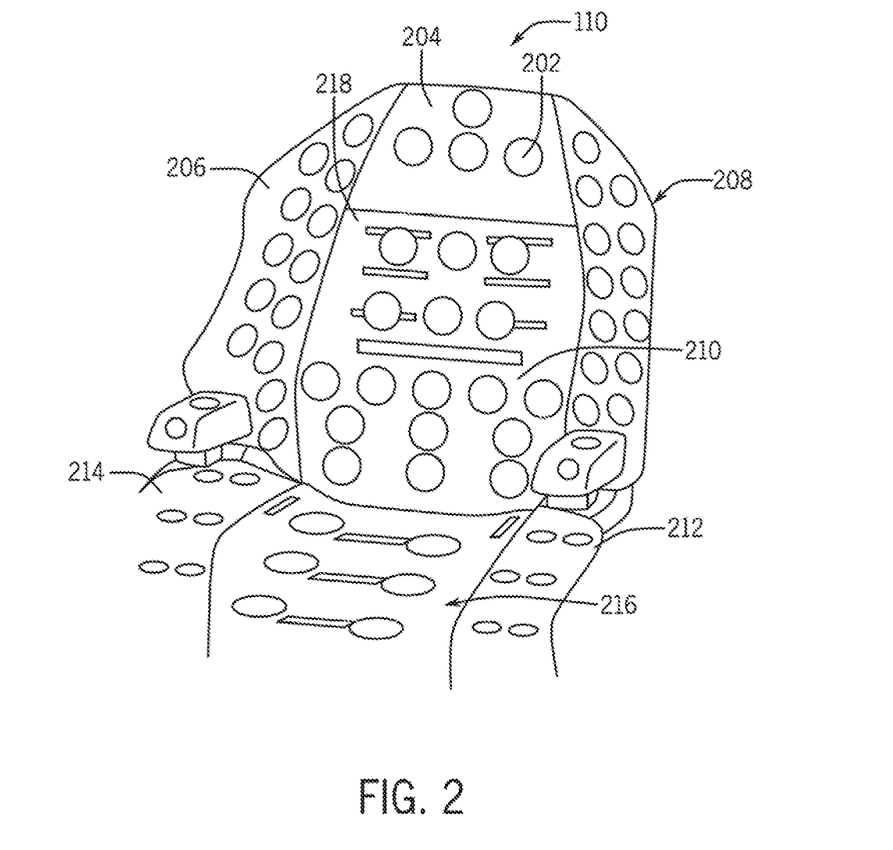
FIG. 2 is an illustrative view of massaging elements disposed within a seat of the vehicle according to an exemplary embodiment.

FIG. 2 is an illustrative view of the massaging elements 202 disposed within the seat 110 of the vehicle 102 according to an exemplary embodiment. In one embodiment, the massaging elements 202 (types of massaging elements 202 not shown) may include respective motors (not shown) that each include a processing unit (not shown) that is operably connected to send and receive data to/from the ECU 104. As discussed below, the ECU 104 and/or the seat massaging application 106 may send commands to one or more of the massaging elements 202 to be actuated to provide one or more types of massaging actions.

In one or more configurations, the massaging elements 202 may include, but may not be limited to, disc shaped elements, ball shaped elements, air filled elements, liquid filled elements, rollers, and the like. In one embodiment, the massaging elements 202 may be utilized to provide various types of massaging techniques including, but not limited to, kneading, knocking, tapping, rubbing, pressing, vibrating, rolling, compression, percussion, and the like. In some configurations, the massaging elements 202 may include heating elements and/or cooling elements (not shown) that may be actuated to provide heating and/or cooling at one or more areas of the driver's body as the driver 122 is seated within the seat 110.

As shown in the illustrative view of FIG. 2, the massaging elements 202 may be disposed at one or more regions 204-218 of the seat 110 that are utilized by the application 106 to provide massaging to particular areas of the driver's body. It is contemplated that the application 106 may utilize any number of regions in addition to or in lieu of the regions 204-218 that are provided at one or more portions of the seat 110. As discussed below, the seat massaging application 106 may determine the massaging plan and may execute the massaging plan to control the one or more of the massaging elements 202 to be actuated at one or more of the regions 204-218 of the seat 110 to provide various types of massaging actions.

In some embodiments, the massaging actions may include, but may not be limited to, manually enabled massaging actions that are selected by the driver 122 through the one or more user interfaces of the application 106 to provide massaging relief to one or more areas of the driver's body per the driver's preference (e.g., driver selected lower back massage). The massaging actions may additionally include default massaging actions that may be provided to generally massage numerous areas of the driver's body within the seat 110 (e.g., rolling massage that covers the neck and entire back of the driver 122). Additionally, the massaging actions may include one or more types of tension relief massaging actions that may provide massaging relief and comfort to the driver 122 to relieve one or more tension points, as determined by the application 106 (e.g., various types of massaging techniques that cover the determined tension point of the driver's neck). It is contemplated that the seat massaging application 106 may include one or more additional types of massaging actions that may be utilized to massage the driver 122 seated within the seat 110 in one or more manners.

Referring again to FIG. 1, in one embodiment, the ECU 104 may be operably connected to a plurality of vehicle systems 136. The plurality of vehicle systems 136 may include, but may not be limited to, (individual vehicle systems not shown), a vehicle audio system, a vehicle lighting system, a vehicle HVAC system, a vehicle infotainment system, and the like. In some embodiments, the seat massaging application 106 may be configured to control one or more of the plurality of vehicle systems 136 to be utilized in accordance with the one or more determined positions and movements of one or more areas of the driver's body and/or the massaging plan determined by the application 106. For example, the seat massaging application 106 may operably control the vehicle audio system to play a specific track/station associated with relaxing music and may additionally enable one or more speakers and subwoofers to provide the music at a specific volume, bass, and treble to enhance the comfort of the driver of the vehicle 102 as the application 106 actuates one or more of the massaging elements 202 to provide automated massaging of the driver 122.

With particular reference to the seat sensors 108, steering wheel sensors 112, and the gear shift sensors 116, the sensors 108 may be configured on one or more sensor pads (not shown) that may be included within one or more regions 204-218 of the seat 110, one or more portions of the steering wheel 114, and one or more portions of the gear shifter 118. In an additional embodiment, the sensor pad(s) may be included within one or more areas of the cabin 120 that are in close proximity to the seat 110, the steering wheel 114, and/or the gear shifter 118. For instance, the one or more sensor pads that include the seat sensors 108 may be located within a floor panel 140 that is located adjacent to the seat 110 or an arm rest (not shown) of a door (not shown) adjacent to the seat 110. In one or more configurations, the sensor pad(s) may be included under a layer of covering/paneling (e.g., leather/cloth covering, plastic/wood/aluminum paneling) that is provided within numerous areas of the cabin 120. Additionally, the sensors 108, 112, 116 may be positioned/disposed in various types of patterns on the sensor pad(s) to capture sensor data.

In one or more embodiments, the seat sensors 108, steering wheel sensors 112, and the gear shift sensors 116 may include, but may not be limited to capacitive touch sensors, electromyography (EEG) sensors, proximity sensors, weight sensors, and the like that are configured to sense data associated with the positions of one or more areas of the driver's body and the movements of one or more areas of the driver's body. In particular, the sensors 108, 112, 116 may be configured to sense the positions and movement of various areas of the driver's body as the driver 122 is seated within the seat 110 and is driving the vehicle 102. For example, the sensors 108, 112, 116 may be configured to sense the positions and movements of the driver 122 as the driver 122 extends his/her arm and grips the steering wheel 114, as the driver 122 turns the steering wheel, as the driver 122 lays back into the seat 110, as the driver 122 rests his/her right hand on the gear shifter 118, as the driver 122 moves his/her right leg to push an accelerator pedal (not shown) or brake pedal (not shown) and the like.

More specifically, the sensed movement and position may be based on muscle movements of the driver 122, shifting of the driver's weight, the location of different areas/parts of the driver's body with respect to the seat 110, the steering wheel 114, and the gear shifter 118, the posture of the driver 122 seated within the seat 110, the movement of different limbs of the driver 122, and the like. For example, capacitive sensors may be used to determine areas of the driver's body that may be touching regions of the seat 110 and the locations of the steering wheel 114. Additionally, EEG sensors may be used to evaluate and record electrical activity produced by muscles within the driver's arms and back to determine muscle movements. In one embodiment, upon the sensing the positions and movements of one or more areas of the driver's body, the seat sensors 108, steering wheel sensors 112, the gear shift sensors 116 may output and communicate sensor data in the form of driver disposition data to the ECU 104.

In an exemplary embodiment, the ECU 104 may also be operably connected to the one or more cameras 138 that may be disposed within one or more portions of the cabin 120 of the vehicle 102. The camera(s) 138 may be configured to capture one or more images/video of the cabin 120 including the seat 110 to ensure that images/video of the driver 122 may be captured as the driver 122 is seated within the seat 110. In one embodiment, upon the camera(s) 138 capturing one or more images/video, the camera(s) 138 may be configured to execute image logic to determine the positions and movements of one or more areas of the driver's body. In particular, the image logic may be executed by the camera(s) 138 to output driver disposition data to the ECU 104 that includes data associated with the positions and movements of one or more areas of the driver's body (e.g., head, arms, legs, torso, legs) as the driver 122 is seated within the seat 110.

In an additional embodiment, the image logic may also be utilized to determine a driver alertness level that may be based on eye movement data, eye gaze data, and/or the positions and/or the movements of one or more areas of the driver's body. In some embodiments, the application 106 may control one or more of the massaging elements 202 to provide tactile feedback as an alert that is used to notify the driver 122 based on a low driver alertness level (e.g., lower than a predetermined threshold).

As discussed below, upon receiving the driver disposition data provided by the sensors 108, 112, 116, and the camera(s) 138 the driver disposition data may be interpreted by the seat massaging application 106 to determine the positional parameters and movement parameters as values that are associated with the sensed/captured positions and movements of one or more areas of the driver's body. As an illustrative example, if the driver 122 is extending his/her arms to grasp the steering wheel 114 and tilting his/her head and neck back towards a head rest 142 of the seat 110, the sensor data and/or the image data may be interpreted to determine one or more positional parameters and movement parameters as values that indicate exact positions and movements of the driver's arms, driver's neck, and the driver's head, among other areas of the driver's body. For instance, such parameters may be associated with the positions and movements of the driver's extended arms, tilted neck, and tilted head with respect to the seat 110, the steering wheel 114, and other components/locations within the cabin 120 of the vehicle 102.

With continued reference to FIG. 1, in an exemplary embodiment, the ECU 104 is additionally operably connected to the plurality of vehicle dynamic sensors 124. The plurality of vehicle dynamic sensors 124 may be configured to provide vehicle dynamic data associated with driving of the vehicle 102. In an exemplary embodiment, the plurality of vehicle dynamic sensors 124 may include, but may not be limited to, speed sensors, steering speed sensors, steering angle sensors, throttle angle sensors, accelerometers, magnetometers, gyroscopes, brake force sensors, wheel speed sensors, wheel turning angle sensors, yaw rate sensors, transmission gear sensors, RPM sensors, and the like (individual sensors not shown).

In one embodiment, the vehicle dynamic data may be outputted as one or more values (e.g., numeric levels) that are associated with the real-time dynamic performance of the vehicle 102 as the driver 122 is seated within the seat 110 and drives the vehicle 102. As discussed below, upon outputting vehicle dynamic data associated with driving of the vehicle 102, the plurality of vehicle dynamic sensors 124 may communicate the vehicle dynamic data to the ECU 104 that is received and further interpreted by the seat massaging application 106.

Upon receiving the vehicle dynamic data from the plurality of vehicle dynamic sensors 124 the seat massaging application 106 may evaluate the vehicle dynamic data in addition to the positional parameters and movement parameters to determine one or more strenuous driving activities that may be associated with one or more areas of the driver's body. As an illustrative example, the vehicle dynamic data may indicate that the driver 122 has conducted numerous sharp right and left turns based on data provided by steering angle sensors, wheel turning angle sensors, and yaw rate sensors. The application 106 may utilize the vehicle dynamic data in addition to positional parameters and movement parameters to determine numerous driving maneuvers that are conducted by the driver 122 using his/her right arm and hands to steer the steering wheel 114 sharply to the right and left to conduct the numerous sharp turns. The application 106 may further determine such actions to be strenuous driving activities that are associated with the driver's arms, shoulders, and upper back.

II. The Seat Massaging Execution Application

The seat massaging application 106 and its specific functionality will now be described in more detail according to an exemplary embodiment. In an exemplary embodiment, the seat massaging application 106 may be stored on the storage unit 126 and executed by the ECU 104 and/or the head unit 132. In additional embodiments, the seat massaging application 106 may be stored on a memory (not shown) of an external device (not shown) (e.g., remote server) and executed by the ECU 104 and/or the head unit 132 of the vehicle 102 via a computer communication medium (e.g., remote network connection) between the ECU 104 and the external device.

In one or more embodiments, the seat massaging application 106 may include a plurality of modules 144-150 that include, but may not be limited to, a driver disposition determinant module 144, a driving activity determinant module 146, a tension point determinant module 148, and a massage execution module 150. It is to be appreciated that the seat massaging application 106 may include additional modules and/or sub-modules of the plurality of modules 140-150. As discussed below, each of the plurality of modules 144-150 may complete computing processing functions as the seat massaging application 106 is operating.

In one embodiment, the seat massaging application 106 may be automatically enabled to operate upon actuation of an accessory or ignition mode of the vehicle 102. In an additional embodiment, the seat massaging application 106 may be manually enabled to operate based on an enablement of the application 106 through the one or more interfaces associated with the application 106 (via the display unit 134 or other input device of the vehicle 102). In an alternative embodiment, the seat massaging application 106 may be enabled to operate upon the vehicle 102 being put into a drive transmission mode, as determined by the transmission gear sensors of the plurality of vehicle dynamic sensors 124. As discussed above, the one or more user interfaces associated with the seat massaging application 106 may allow the application 106 to enable the automated massaging mode and associated settings to the driver 122 seated within the seat 110.

In an exemplary embodiment, upon enablement of the automated massaging mode, the plurality of modules 144-150 may execute computer commands to provide automated massaging that is directed to one or more regions 204-218 of the seat 110 to massage one or more areas of the driver's body. In one embodiment, the driver disposition determinant module 144 may be configured to communicate with the ECU 104 to receive the driver disposition data from the seat sensors 108, the steering wheel sensors 112, the gear shift sensors 116, and/or the camera(s) 138. As discussed below, the driver disposition determinant module 144 may also be configured to evaluate the driver disposition data to determine the positional parameters and movement parameters that are associated with positions and movements of one or more areas of the driver's body during a predetermined period of time. Upon determining the positional parameters and the movement parameters, the driver disposition determinant module 144 may be configured to communicate the positional parameters and movement parameters to the driving activity determinant module 146 and the tension point determinant module 148.

In one embodiment, the driving activity determinant module 146 may be configured to receive vehicle dynamic data from the vehicle dynamic sensors 124 for a predetermined period of time. As discussed in more detail below, the driving activity determinant module 146 may be configured to analyze the vehicle dynamic data received for the predetermined period of time and may determine one or more driving maneuvers. The one or more driving maneuvers may be further evaluated by the module 146 with respect to the positional parameters and the movement parameters to determine the one or more strenuous driving activities that are associated with one or more areas of the driver's body. Upon determining the one or more strenuous driving activities, the driving activity determinant module 146 may be configured to communicate data in the form of values (e.g., coordinate values associated with positions, movements, and maneuvers) that are associated with the one or more strenuous driving activities to the tension point determinant module 148.

In an exemplary embodiment, upon receipt of the positional parameters, movement parameters, and the data associated with the one or more strenuous driving activities, the tension point determinant module 148 may access the code lookup table 128 on the storage unit 126 and may query the table 128 to determine one or more predetermined code values that correspond to the positional parameters, movement parameters, and values associated with the one or more strenuous driving activities. In one embodiment, the predetermined code values may include specific character and/or numerical designations (e.g., binary code) that may be associated with particular positions of one or more areas of the driver's body. Such positions may pertain to the driver's sitting posture, various specific positions associated with different areas of the driver's body (e.g., head position, neck position, back position, arm position etc.), the alignment of different areas of the driver's body with respect to the seat 110, the steering wheel 114, and the gear shifter 118, and additional values that may pertain to the dimensions of the areas of the driver's body (e.g., height of the driver, length of arms, length of legs).

In one or more embodiments, the predetermined code values may also include specific character and/or numerical designations that may be associated with particular movements of one or more areas of the driver's body. Such movements may pertain to movement of various muscles of the driver's body, movements of various limbs of the driver's body, movements of various appendages of the driver's body, a degree of movement of the particular areas of the driver's body, a direction of movement of the particular areas of the driver's body, and the like. Additionally, the predetermine code values may include specific character and/or numerical designations that may be associated with the one or more strenuous driving activities. In particular, the predetermined code values may include specific character and/or numerical designations that pertain to the positions and movements of one or more areas of the driver's body that pertain to a number of driving maneuvers/driving related activities that may result in substantial usage (e.g., causing tension) of one or more particular areas of the driver's body.

In one embodiment, the tension point determinant module 148 may convert the positional parameters, movement parameters, and/or values associated with the one or more strenuous driving activities into the one or more corresponding predetermined code values. The tension point determinant module 148 may additionally determine time duration (values) that pertain to a duration of time associated with each of the predetermined code values converted by the tension point determinant module 148.

The tension point determinant module 148 may additionally access the tension point map 130 and may map the one or more predetermined coded values to one or more tension points that are associated with specific areas of the driver's body (e.g., right shoulder, neck, lower back) that may be substantially utilized based on the positions and the durations of positions of the one or more areas of the driver's body, the movements and the durations of movements of the one or more areas of the driver's body, and the one or more strenuous driving activities and durations of such activities associated with the one or more areas of the driver's body. Upon determining the one or more tension points, the tension point determinant module 148 may be configured to communicate respective data to the massage execution module 150 of the seat massaging application 106.

In one or more embodiments, the massage execution module 150 may process the massaging plan that includes instructions to actuate one or more of the massaging elements 202 at the one or more of the regions 204-218 of the seat 110 in one or more manners and at one or more durations. In particular, the massaging plan may include instructions to provide various types of massaging actions that may be provided at one or more regions 204-218 of the seat 110 by selectively actuating one or more of the massaging elements 202 in a certain order, timeframe, and duration to massage one or more specific areas of the driver's body that pertain to the one or more tension points associated with the driver 122.

In an exemplary embodiment, upon processing the massaging plan, the massage execution module 150 may communicate one or more commands to the ECU 104 to control one or more of the massaging elements 202 disposed within the seat 110 to provide massaging to the driver's body based on the massaging plan. In particular, the massage execution module 150 may communicate one or more commands to one or more massaging elements 202 disposed within one or more regions 204-218 of the seat 110 to provide various types of massaging actions by selectively actuating one or more of the massaging elements 202 in a certain order, timeframe, and duration according to the massaging plan. The one or more massaging elements 202 may consequently massage one or more areas of the driver's body as the driver 122 is seated within the seat 110 to provide massaging at the one or more determined tension points associated with the one or more areas of the driver's body.

In additional embodiments, the massage execution module 150 may also send one or more commands to the plurality of vehicle systems 136 to control one or more of the plurality of vehicle systems 136 to be utilized in accordance with the one or more determined positions and movements of one or more areas of the driver's body and/or the massaging plan as determined by the application 106.

III. Exemplary Methods Executed by the Seat Massaging Execution Application

Figure 3:
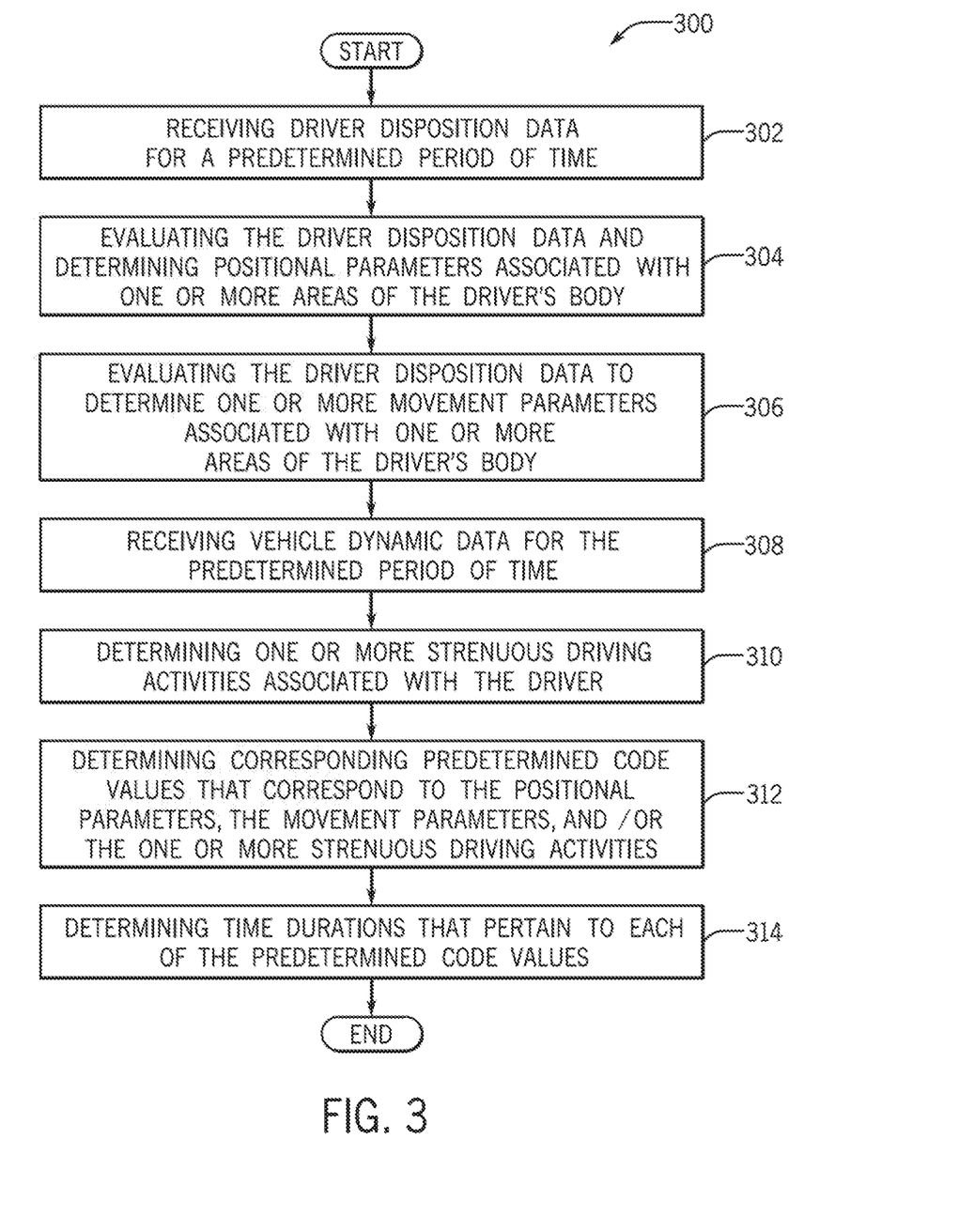
FIG. 3 is a process flow diagram of a method for determining positions, movements, and one or more strenuous driving activities associated with a driver according to an exemplary embodiment.

FIG. 3 is a process flow diagram of a method 300 for determining positions, movements, and one or more strenuous driving activities associated with the driver 122 according to an exemplary embodiment. FIG. 3 will be described with reference to the components of FIG. 1, though it is to be appreciated that the method 300 of FIG. 3 may be used with additional and/or alternative system components. The method 300 may begin at block 302, wherein the method 300 includes receiving driver disposition data for a predetermined period of time.

In an exemplary embodiment, the driver disposition determinant module 144 may communicate with the ECU 104 of the vehicle 102 to receive the driver disposition data from the seat sensors 108, the steering wheel sensors 112, the gear shift sensors 116 and/or the camera(s) 138. As discussed above, upon sensing the positions and movements of various areas of the driver's body, the seat sensors 108, steering wheel sensors 112, the gear shift sensors 116 may output and communicate sensor data in the form of driver disposition data to the ECU 104. Additionally, upon capturing one or more images/video, the camera(s) 138 may execute image logic to determine the positions and movements of areas of the driver's body and may output driver disposition data to the ECU 104.

In one embodiment, the driver disposition determinant module 144 may receive the driver disposition data from the sensors 108, 112, 116 and/or the camera(s) 138 for a predetermined period of time. In some embodiments, the predetermined period of time may include a plurality of timeframes that may be determined in one or more trips of the vehicle 102. In other words, the data sensed and/or captured for the predetermined period of time may or may not include data that is sensed and/or captured during a continuous (e.g., uninterrupted) period of time.

The driver disposition data may indicate the data associated with the positions of one or more areas of the driver's body seated within the seat 110 during the predetermined period of time. The driver disposition data may additionally include movements of one or more areas of the driver's body seated within the seat 110 during the predetermined period of time. For example, the driver disposition data may indicate positions and movements relating to the driver's torso, arms, hands, trunk, legs, thighs, hips, back, neck, head, and the like, for the predetermined period of time as the driver 122 is seated within the seat 110 and may drive the vehicle 102. In some embodiments, upon receiving the driver disposition data, the driver disposition determinant module 144 may access the storage unit 126 to store the driver disposition data on the storage unit 126 to be further accessed by the application 106.

The method 300 may proceed to block 304, wherein the method 300 may include evaluating the driver disposition data and determining positional parameters associated with one or more areas of the driver's body. In one embodiment, the driver disposition determinant module 144 may evaluate the driver disposition data that is provided by the sensors 108, 112, 116 to analyze data points within the driver disposition data that are associated with the individual (e.g., separate, distinct) positions of one or more areas of the driver's body that are sensed for the predetermined period of time. Upon evaluation of the driver disposition data provided by the sensors 108, 112, 116, the driver disposition determinant module 144 may additionally evaluate the driver disposition data that is provided by the camera(s) 138 to analyze data points within the driver disposition data that are associated with individual positions of one or more areas of the driver's body that are captured for the predetermined period of time.

The driver disposition determinant module 144 may thereby extract data from the data points and may aggregate the data as sensed by the sensors 108, 112, 116 and the data as captured by the camera(s) 138. The driver disposition determinant module 144 may evaluate the aggregated data to determine positional parameters that are associated with positions of the one or more areas of the driver's body sensed/captured during the predetermined period of time. In other words, the positional parameters may include values that indicate exact positions of the one or more specified areas of the driver's body during the predetermined period of time that they are sensed and captured.

In an alternate embodiment, the driver disposition determinant module 144 may extract data from the data points of the driver disposition data received from the sensors 108, 112, 116. The module 144 may utilize the data points derived from the sensor based driver disposition data to evaluate information associated with the positions of the one or more specific areas of the driver's body (e.g., neck positions, back positions, torso positions) that may be more clearly captured by the sensors 108, 112, 116 (as oppose to the camera(s) 138) to determine the positional parameters that are associated with the one or more respective areas of the driver's body. Accordingly, the positional parameters may include values that indicate the exact positions of the one or more specified areas of the driver's body as determined from the driver disposition data provided by the sensors 108, 112, 116.

The driver disposition determinant module 144 may additionally extract data from the data points of the driver disposition data received from the camera(s) 138. The module 144 may utilize data points derived from the image based data to evaluate information associated with the positions of one or more additional areas of the driver's body (e.g., shoulder positions, hand positions, head positions) that may be more clearly captured by the camera(s) 138 (as oppose to the sensors 108, 112, 116) to determine the positional parameters that are associated with the one or more respective areas of the driver's body. Accordingly, the positional parameters may include values that indicate the exact positions of the one or more specified areas of the driver's body as determined from the driver disposition data provided by the camera(s) 138.

The method 300 may proceed to block 306, wherein the method 300 may include evaluating the driver disposition data to determine one or more movement parameters associated with respective areas of the driver's body. In one embodiment, the driver disposition determinant module 144 may evaluate the driver disposition data that is provided by the sensors 108, 112, 116 to analyze data points within the driver disposition data that are associated with the individual movements of one or more areas of the driver's body that are sensed for the predetermined period of time. Upon evaluation of the driver disposition data provided by the sensors 108, 112, 116, the driver disposition determinant module 144 may additionally evaluate the driver disposition data that is provided by the camera(s) 138 to analyze data points within the driver disposition data that are associated with individual movements of one or more areas of the driver's body that are captured for the predetermined period of time.

The driver disposition determinant module 144 may thereby extract data from the data points and may aggregate the data as sensed by the sensors 108, 112, 116 and the data as captured by the camera(s) 138. The driver disposition determinant module 144 may evaluate the aggregated data to determine movement parameters that are associated with movements of the one or more areas of the driver's body sensed/captured during the predetermined period of time. In other words, the movement parameters may include values that indicate exact movements of the one or more specified areas of the driver's body during the predetermined period of time that they are sensed and captured.

In an alternate embodiment, the driver disposition determinant module 144 may extract data from the data points from the driver disposition data received from the sensors 108, 112, 116. The module 144 may utilize the data points derived from the sensor based driver disposition data to evaluate information associated with the movements of the one or more specific areas of the driver's body (e.g., neck movements, back movements, torso movements) that may be more clearly captured by the sensors 108, 112, 116 (as oppose to the camera(s) 138) to determine the movement parameters that are associated with the one or more respective areas of the driver's body. Accordingly, the movement parameters may include values that indicate the exact movements of the one or more specified areas of the driver's body as determined from the driver disposition data provided by the sensors 108, 112, 116.

The driver disposition determinant module 144 may additionally extract data from the data points from the driver disposition data received from the camera(s) 138. The module 144 may utilize data points derived from the image based data to evaluate information associated with the movements of one or more additional areas of the driver's body (e.g., shoulder movements, hand movements, head movements) that may be more clearly captured by the camera(s) 138 (as oppose to the sensors 108, 112, 116) to determine the movement parameters that are associated with the one or more respective areas of the driver's body. Accordingly, the movement parameters may include values that indicate the exact movements of the one or more specified areas of the driver's body as determined from the driver disposition data provided by the camera(s) 138.

The method 300 may proceed to block 308, wherein the method 300 may include receiving vehicle dynamic data for the predetermined period of time. In an exemplary embodiment, the driving activity determinant module 146 may communicate with the ECU 104 to receive vehicle dynamic data associated the vehicle 102 as it is driven by the driver 122. The vehicle dynamic data may be outputted as one or more values (e.g., numeric levels) that are associated with the real-time dynamic performance of the vehicle 102 as the driver 122 drives the vehicle 102 for the predetermined period of time. For example, the vehicle dynamic data may include data that includes one or more speed values of the vehicle 102, one or more steering angle values of the vehicle 102, one or more braking force values of the vehicle 102, and the like.

The method 300 may proceed to block 310, wherein the method 300 may include determining one or more strenuous driving activities associated with the driver 122. In one embodiment, the driving activity determinant module 146 may evaluate the vehicle dynamic data received for the predetermined period of time and may determine one or more driving maneuvers that may have been conducted by the driver 122 that correspond to the vehicle dynamic data. The one or more driving maneuvers may be associated with the real-time dynamic performance of the vehicle 102 as the driver 122 drives the vehicle 102 for the predetermined period of time. For example, the one or more driving maneuvers may include turning the steering wheel 114 at a certain speed and direction at a certain number of degrees, pushing of the brake pedal at a certain force, pushing of an accelerator pedal at a certain force, and the like.

In one embodiment, upon determining the one or more driving maneuvers, the driving activity determinant module 146 may analyze the positional parameters (determined at block 304) and movement parameters (determined at block 306) that are associated with one or more areas of the driver's body. In particular, the driving activity determinant module 146 may be configured to analyze the positional parameters and the movement parameters pertaining to one or more instances of time that correspond to instances of time that each of the one or more driving maneuvers that are conducted by the driver 122. Based on the analysis of the positional parameters and the movement parameters, the driving activity determinant module 146 may determine positions and movements of one or more areas of the driver's body that are specifically utilized to conduct each of the one or more driving maneuvers during the predetermined period of time.

In an exemplary embodiment, the driving activity determinant module 146 may evaluate the one or more types of driving maneuvers and the positions and movements of areas of the driver's body to determine a degree of physical strain associated with each of the one or more of driving maneuvers conducted by the driver 122. The degree of physical strain may include a numerical value that may be based on the types of positions, the duration of each of the positions, the degree of the movements, and the duration of the movements of the one or more areas of the driver's body as the driver 122 conducts each of the driving maneuvers. Additionally, the degree of physical strain may be based on the type of driving maneuver(s) (e.g., turning, accelerating, braking), a performance of the vehicle 102 during the driving maneuver(s) (e.g., speed of the vehicle 102, yaw rate of the vehicle 102), a severity of the driving maneuver(s) (e.g., immediate braking, slowly braking), external pressures that may affect the positons or movements of one or more areas of the driver's body (e.g., movement caused by inertial force) and the like.

Upon determining the degree of physical strain associated with each of the one or more driving maneuvers, the driving activity determinant module 146 may evaluate the degree of physical strain associated with each of the one or more driving maneuvers against one or more predetermined thresholds (e.g., values) that may be selectively utilized based on the vehicle dynamic data of each trip and/or the duration of each trip of the vehicle 102 (e.g., based on the average speed, braking force, steering angles, and duration of the trip). The driving activity determinant module 146 may thereby determine the one or more strenuous driving activities that may be associated with one or more areas of the driver's body for the predetermined period of time.

In particular, if the degree of physical strain may be associated with each of the one or more driving maneuvers that is determined to be above one or more of the predetermined thresholds that are selectively utilized, the driving activity determinant module 146 may determine the one or more driving maneuvers in addition to the related positions and movements of the one or more areas of the driver's body as the one or more strenuous driving activities. In one embodiment, upon determining the one or more strenuous driving activities, the driving activity determinant module 146 may output values (e.g., coordinate values) that are associated with the one or more strenuous driving activities. In particular, the values may pertain to the positions and movements of one or more particular areas of the driver's body used when conducting each of the one or more driving maneuvers associated with the one or more strenuous driving activities.

The method 300 may proceed to block 312, wherein the method 300 may include determining predetermined code values that correspond to the positional parameters, movement parameters, and/or one or more strenuous driving activities. In an exemplary embodiment, the tension point determinant module 148 may access the code lookup table 128 on the storage unit 126 and may query the table 128 to retrieve one or more predetermined code values that correspond to the positional parameters, movement parameters, and/or the values associated with the one or more strenuous driving activities.

As discussed above, the predetermined code values may include specific character and/or numerical designations (e.g., binary code) that may be associated with particular positions of one or more areas of the driver's body corresponding to the positional parameters. The specific character and/or numerical designations may also be associated with particular movements of one or more areas of the driver's body corresponding to the movement parameters. Additionally, the specific character and/or numerical designations may be associated with the values that are associated with the one or more strenuous driving activities. Upon querying the code lookup table 128, the tension point determinant module 148 may convert the positional parameters, movement parameters, and/or the values associated with the one or more strenuous driving activities into the one or more corresponding predetermined code values as retrieved by the tension point determinant module 148.

The method 300 may proceed to block 314, wherein the method 300 may include determining time durations that pertain to each of the predetermined code values. Upon retrieving the one or more predetermined code values, the tension point determinant module 148 may evaluate the positional parameters, movement parameters, and values associated with the one or more strenuous driving activities and may determine time durations (e.g., time based values) that pertain to each of the predetermined code values. In particular, the time durations may be associated with the amount of time (e.g., number of seconds/minutes) associated with each of the particular positions of one or more areas of the driver's body, each of the particular movements of one or more areas of the driver's body, and each of the positions and movements of one or more areas of the driver's body corresponding with conducting the one or more driving maneuvers associated with the one or more strenuous driving activities represented by the predetermined code values.

Figure 4:
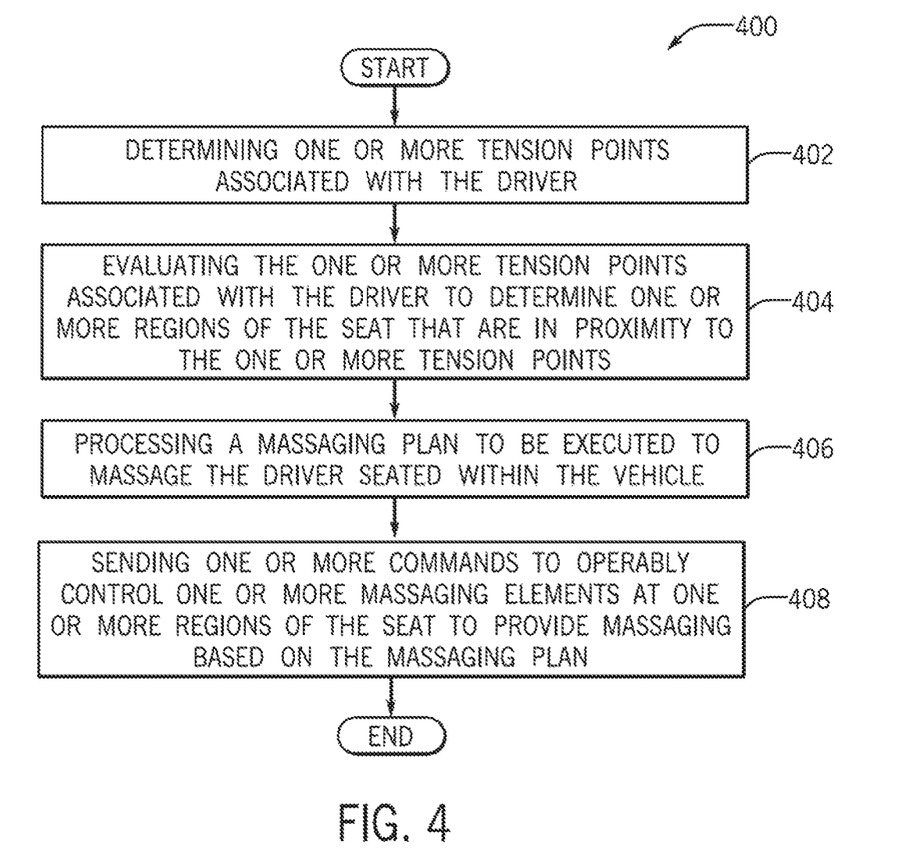
FIG. 4 is a process flow diagram of a method for processing and executing a massage plan according to an exemplary embodiment.

FIG. 4 is a process flow diagram of a method 400 for processing and executing the massage plan according to an exemplary embodiment. FIG. 4 will be described with reference to the components of FIGS. 1 and 2, though it is to be appreciated that the method 400 of FIG. 4 may be used with additional and/or alternative system components. The method 400 may begin at block 402, wherein the method 400 may include determining one or more tension points associated with the driver 122.

In an exemplary embodiment, the tension point determinant module 148 may evaluate the predetermined coded values and associated time durations and may rank the predetermined coded values based on a description of the code value and/or the associated time duration. The tension point determinant module 148 may access the tension point map 130 and may map one or more tension points that pertain to specific areas of the driver's body that may be substantially utilized based on the evaluation of the predetermined code values and the associated time durations.

In one or more embodiments, if more than one tension point is determined, the tension point determinant module 148 may rank the tension points based on the utilization of one or more areas of the driver's body (e.g., tension points associated with areas of the driver's body that are least utilized/tense to tension points associated with areas of the driver's body that are most utilized/tense). In an additional embodiment, the tension point determinant module 148 may rank the tensions points based on durations of positions and/or movements of the one or more areas of the driver's body such that areas of the driver's body that are positioned or moved at/for a longer duration of time are ranked higher. In an alternate embodiment, the tension point determinant module 148 may rank the tension points that are based on the one or more strenuous driving activities higher than one or more additional tensions points that are based on the positions or movements of the driver's body that are not associated with the one or more strenuous driving activities. It is to be appreciated that the tension point determinant module 148 may rank the tension points based on many factors that may be associated to the driver's positions, movements, vehicle dynamic data, driver settings, and/or additional sensor based data.

The method 400 may proceed to block 404, wherein the method 400 may include evaluating the one or more tension points associated with the driver to determine one or more regions 204-218 of the seat 110 that are in proximity to the one or more tension points. In an exemplary embodiment, the massage execution module 150 may communicate with the tension point determinant module 148 to receive data associated with the one or more tension points. The massage execution module 150 may evaluate the data and may determine one or more regions 204-218 of the seat 110 that are located within a predetermined proximity of the areas of the driver's body that pertain to the one or more tension points.

In some embodiments, the massage execution module 150 may additionally evaluate the one or more massaging elements 202 that are located within the one or more determined regions 204-218 to determine one or more specific massaging elements 202 that may be actuated to provide one or more types of massaging to provide a highest amount of impact with respect to the areas of the driver's body that pertain to the one or more tension points.

The method 400 may proceed to block 406, wherein the method 400 may include processing a massaging plan to be executed to massage the driver 122 seated within the vehicle 102. In an exemplary embodiment, the massage execution module 150 may determine one or more types of tension relief massaging actions that may be conducted by the one or more massaging elements 202 at the one or more determined regions 204-218 of the seat 110 (determined at block 404) to massage one or more specific areas of the driver's body pertaining to the one or more tension points associated with the driver 122.

The massage execution module 150 may additionally process a massaging plan that includes computer executable instructions to actuate the one or more of the massaging elements 202 at the one or more determined regions 204-218 of the seat 110 in one or more manners and at one or more durations. The massaging plan may include instructions to provide the one or more types of tension relief massaging actions at the one or more regions 204-218 of the seat 110 by selectively actuating one or more of the massaging elements 202 in a certain order, timeframe, and duration to massage one or more specific areas of the driver's body pertaining to the one or more tension points associated with the driver 122.

In one embodiment, when more than one tension point is determined (at block 402), the massage execution module 150 may include instructions to provide the one or more types of tension relief massaging actions in an order, timeframe, and duration that is based on the ranking of the tension points as determined by the tension point determinant module 148 (as discussed above with respect to block 402). In some embodiments, the massage execution module 150 may process the massaging plan to include instructions to provide default massaging actions (e.g., massaging actions associated with one or more default massaging modes of the application 106) that may be provided at one or more additional regions 204-218 of the seat 110 in one or more intervals. The one or more intervals may be provided in one or more timeframes that fall in between the massaging of the one or more specific areas of the driver's body pertaining to the one or more tension points. This functionality may ensure that additional areas of the driver's body may receive massaging based on default massaging actions that are provided by one or more of the massaging elements 202 in addition to the one or more tension relief massaging actions.

The method 400 may proceed to block 408, wherein the method 400 may include sending one or more commands to operably control one or more of the massaging elements 202 at one or more regions 204-218 of the seat 110 to provide massaging based on the massaging plan. In one embodiment, upon processing the massaging plan, the massage execution module 150 may communicate one or more commands to the ECU 104 to control one or more of the massaging elements disposed within the seat 110 to provide massaging based on the massaging plan.

In particular, the massage execution module 150 may communicate one or more commands to one or more of the massaging elements 202 disposed within one or more regions 204-218 of the seat 110 to provide various types of massaging actions (tension relief massaging actions, default massaging actions) in accordance with the massaging plan. The massaging actions may be provided at one or more pressure levels by selectively actuating one or more of the massaging elements 202 in a certain order, timeframe, and duration to massage one or more specific areas of the driver's body based on the massaging plan. The one or more massaging elements 202 may consequently massage one or more areas of the driver's body and may provide one or more tension relief massaging actions to one or more areas that pertain to the one or more tension points as the driver 122 is seated within the seat 110.

Figure 5:
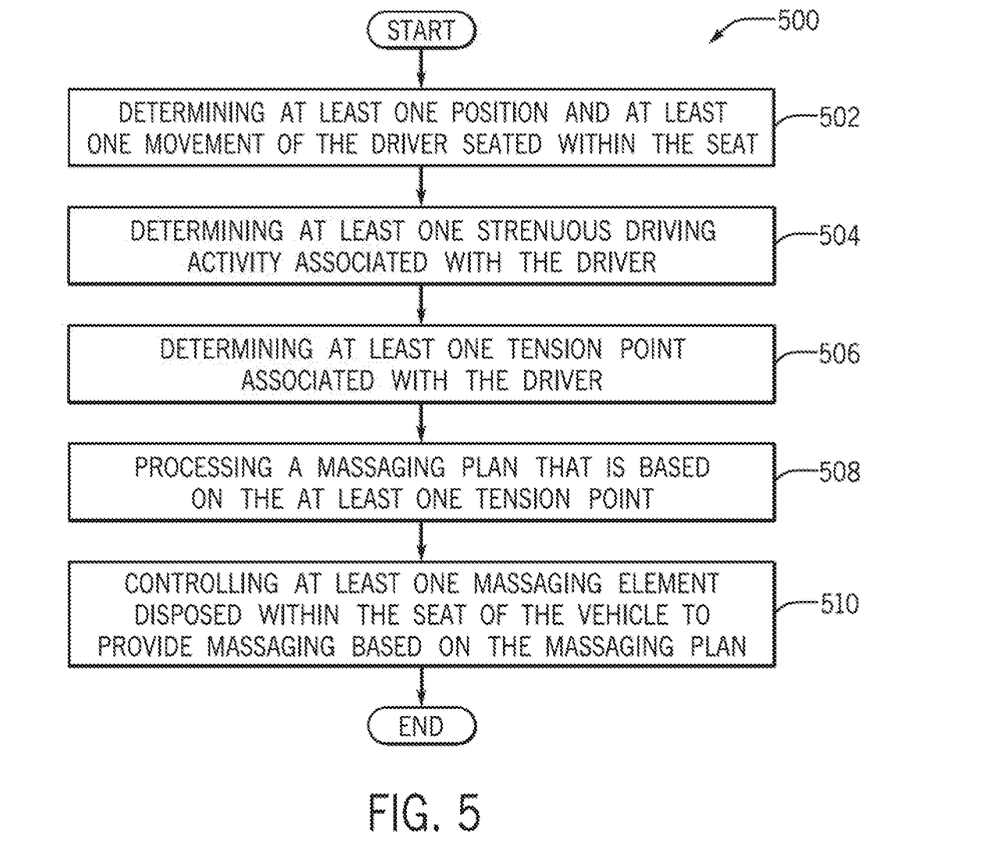
FIG. 5 is a process flow diagram of a method for providing massaging within the vehicle according to an exemplary embodiment.

FIG. 5 is a process flow diagram of a method 500 for providing massaging within a vehicle 102 according to an exemplary embodiment. FIG. 5 will be described with reference to the components of FIGS. 1 and 2, though it is to be appreciated that the method 500 of FIG. 5 may be used with additional and/or alternative system components. The method 500 may begin at block 502, wherein the method 500 includes determining at least one position and at least one movement of the driver 122 seated within the seat 110. The method 500 may proceed to block 504, wherein the method 500 includes determining at least one strenuous driving activity associated with the driver 122.

The method 500 may proceed to block 506, wherein the method 500 may include determining at least one tension point associated with the driver 122. The method 500 may proceed to block 508, wherein the method 500 may include processing a massaging plan that is based on the at least one tension point. The method 500 may proceed to block 510, wherein the method 500 may include controlling at least one massaging element 202 disposed within the seat 110 of the vehicle 102 to provide massaging based on the massaging plan.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing massaging within a vehicle, comprising:
   receiving vehicle dynamic data associated with a real-time dynamic performance of the vehicle as the vehicle is being driven for a predetermined period of time;
   determining at least one strenuous driving activity associated with a driver of the vehicle based on at least one driving maneuver that is associated with the real-time driving performance of the vehicle;
   analyzing positional parameters and movement parameters that are associated with at least one area of a body of the driver that is utilized to conduct the at least one driving maneuver for the predetermined period of time; and
   controlling at least one massaging element disposed within the seat of the vehicle to provide massaging to the at least one area of the body of the driver.

2. The computer-implemented method of claim 1, wherein the positional parameters are associated with at least one position of the at least one area of the body of the driver and the movement parameters pertain to at least one movement of the at least one area of the body of the driver.

3. The computer-implemented method of claim 2, wherein analyzing the positional parameters and the movement parameters includes evaluating the at least one driving maneuver, the at least one position of the at least one area of the body of the driver, and the at least one movement of the at least one area of the body of the driver as the vehicle is being driven for a predetermined period of time.

4. The computer-implemented method of claim 3, wherein analyzing the positional parameters and the movement parameters includes determining a degree of physical strain associated with the at least one driving maneuver that is associated with the real-time driving performance of the vehicle.

5. The computer-implemented method of claim 4, wherein the degree of physical strain associated with the at least one driving maneuver includes a numerical value that is based on a type of at least one position, a duration of at least one position, a degree of the at least one movement, and a duration of the at least one movement with respect to the at least one area of the body of the driver that is utilized to conduct the at least one driving maneuver.

6. The computer-implemented method of claim 5, wherein the degree of physical strain associated with the at least one driving maneuver is based on a type of the at least one driving maneuver, a performance of the vehicle during the at least one driving maneuver, a severity of the at least one driving maneuver, and at least one external pressure that affects the at least one position or the at least one movement of the at least one area of the body of the driver.

7. The computer-implemented method of claim 1, further including determining at least one tension point associated with the driver that corresponds to the positional parameters, the movement parameters, and the at least one strenuous driving activity associated with the driver, wherein the at least one tension point is associated with the at least one area of the body of the driver.

8. The computer-implemented method of claim 7, further including evaluating the at least one tension point and determining at least one region of the seat that is in a predetermined proximity to the at least one area of the body of the driver that is associated to the at least one tension point.

9. The computer-implemented method of claim 8, wherein at least one command is communicated to at least one massaging element disposed within at least one region of the seat to provide various types of massaging actions at various pressure levels.

10. A system for providing massaging within a vehicle, comprising:
 a memory storing instructions when executed by a processor cause the processor to:
 receive vehicle dynamic data associated with a real-time dynamic performance of the vehicle as the vehicle is being driven for a predetermined period of time;
 determine at least one strenuous driving activity associated with a driver of the vehicle based on at least one driving maneuver that is associated with the real-time driving performance of the vehicle;
 analyze positional parameters and movement parameters that are associated with at least one area of a body of the driver that is utilized to conduct the at least one driving maneuver for the predetermined period of time; and
 control at least one massaging element disposed within the seat of the vehicle to provide massaging to the at least one area of the body of the driver.

11. The system of claim 10, wherein the positional parameters are associated with at least one position of the at least one area of the body of the driver and the movement parameters pertain to at least one movement of the at least one area of the body of the driver.

12. The system of claim 11, wherein analyzing the positional parameters and the movement parameters includes evaluating the at least one driving maneuver, the at least one position of the at least one area of the body of the driver, and the at least one movement of the at least one area of the body of the driver as the vehicle is being driven for a predetermined period of time.

13. The system of claim 12, wherein analyzing the positional parameters and the movement parameters includes determining a degree of physical strain associated with the at least one driving maneuver that is associated with the real-time driving performance of the vehicle.

14. The system of claim 13, wherein the degree of physical strain associated with the at least one driving maneuver includes a numerical value that is based on a type of at least one position, a duration of at least one position, a degree of the at least one movement, and a duration of the at least one movement with respect to the at least one area of the body of the driver that is utilized to conduct the at least one driving maneuver.

15. The system of claim 14, wherein the degree of physical strain associated with the at least one driving maneuver is based on a type of the at least one driving maneuver, a performance of the vehicle during the at least one driving maneuver, a severity of the at least one driving maneuver, and at least one external pressure that affects the at least one position or the at least one movement of the at least one area of the body of the driver.

16. The system of claim 10, further including determining at least one tension point associated with the driver that corresponds to the positional parameters, the movement parameters, and the at least one strenuous driving activity associated with the driver, wherein the at least one tension point is associated with the at least one area of the body of the driver.

17. The system of claim 16, further including evaluating the at least one tension point and determining at least one region of the seat that is in a predetermined proximity to the at least one area of the body of the driver that is associated to the at least one tension point.

18. The system of claim 17, wherein at least one command is communicated to at least one massaging element disposed within at least one region of the seat to provide various types of massaging actions at various pressure levels.

19. A non-transitory computer readable storage medium storing instructions that when executed by a computer, which includes a processor perform a method, the method comprising:
 receiving vehicle dynamic data associated with a real-time dynamic performance of the vehicle as the vehicle is being driven for a predetermined period of time;
 determining at least one strenuous driving activity associated with a driver of the vehicle based on at least one driving maneuver that is associated with the real-time driving performance of the vehicle;
 analyzing positional parameters and movement parameters that are associated with at least one area of a body of the driver that is utilized to conduct the at least one driving maneuver for the predetermined period of time; and
 controlling at least one massaging element disposed within the seat of the vehicle to provide massaging to the at least one area of the body of the driver.

20. The non-transitory computer readable storage medium of claim 19, further including evaluating the at least one tension point and determining at least one region of the seat that is in a predetermined proximity to the at least one area of the body of the driver that is associated to the at least one tension point.

* * * * *